March 11, 1969 W. D. TRIPPE 3,432,757

LEADING EDGE GATING TECHNIQUE FOR PULSE RECEIVER

Filed July 1, 1965

Sheet 1 of 2

INVENTOR
WALTER D. TRIPPE

BY Julian C. Renfro

ATTORNEY

March 11, 1969 W. D. TRIPPE 3,432,757

LEADING EDGE GATING TECHNIQUE FOR PULSE RECEIVER

Filed July 1, 1965 Sheet 2 of 2

INVENTOR
WALTER D. TRIPPE

BY Julian C. Renfro
ATTORNEY

United States Patent Office 3,432,757
Patented Mar. 11, 1969

3,432,757
LEADING EDGE GATING TECHNIQUE FOR PULSE RECEIVER

Walter D. Trippe, Orlando, Fla., assignor to Martin-Marietta Corporation, Middle River, Md., a corporation of Maryland Filed July 1, 1965, Ser. No. 468,897
U.S. Cl. 325—322 19 Claims
Int. Cl. H04b 1/16, 1/06

ABSTRACT OF THE DISCLOSURE

This invention relates to a leading edge gating technique for a pulse receiver, in accordance with which the gating of incident energy pulses is accomplished before intermediate frequency conversion, thus making possible the use of a narrower bandwidth IF amplifier than otherwise would be possible.

The present invention relates to the problem of determining the direction, from a receiving system, of a source of electromagnetic radiation pulses. Radio direction finding offers many instrumentalities for determining the direction of incidence of electromagnetic radiation, but it has been appreciated that the direction of incidence, due to multi-path transmission, is not a dependable means of determining the direction of the radiation source from the receiver. In pulse direction finding, it has been recognized that the first incident signal components, necessarily following the most direct path from the transmitter to the receiver, afford a more dependable basis of determination, since it most nearly approximates and, in many instances, constitutes a signal component transmitted rectilinearly.

Consequently, it has been proposed to gate only the leading edge of received pulse signals on a time basis into direction-finding equipment to avoid the confusing and indeterminate indications which may result from subsequently received signal components following paths other than the most nearly rectilinear transmission channel.

In accomplishing these objectives, it has been conventional to gate the leading edge of the pulse signal energy after frequency conversion and passage through an intermediate frequency amplifier. These expedients have been far from satisfactory because such systems impose conflicting design requirements on the intermediate frequency amplifier which inherently degrade receiver performance otherwise attainable. In particular, leading edge gating of intermediate frequency pulse energy necessarily requires that the design of the intermediate frequency amplifier achieve a very rapid rise time in order to develop the leading edge signal components on which such direction determination depends. Since rise time is an inverse function of amplifier bandwidth, a short rise time demands broad-banded intermediate frequency amplifiers. Such amplilers, of necessity, produce high noise to signal ratios inherently, and are subject necessarily to amplifying whatever adjacent frequency energy unrelated to the desired radiation is present.

According to the present invention, these disadvantages are avoided by gating the incident energy pulses before intermediate frequency amplification, which permits relaxation of the stringent rise time requirements encountered in prior systems, and design of the intermediate frequency amplifier components for optimum bandwidth and system sensitivity for a desired signal.

Preferably, the system of the present invention gates the incident pulse energy before frequency conversion at the mixer. In the specific embodiments disclosed, this gating is achieved by interrupting conduction of the local oscillator energy to the mixer means for terminating receive response after a preselected time of reception of th incident pulse energy.

Further features of the present invention provide fo gating the leading edge of incident pulse energy prior t intermediate frequency amplification on receipt of signa voltage levels above a predetermined value. Where sucl voltage levels are not attained, the system maintains op eration without leading edge gating. Thus, receivers em bodying the present invention are operative with maxi mum attainable efficiency over a broad range of con ditions.

The present invention is particularly applicable t monopulse receivers, but is obviously useful in other type of equipment where leading edge gating is desirable and if applied after intermediate frequency amplification, produces similarly conflicting design considerable for the amplifier equipment.

It is accordingly a primary object of the invention to provide optimum receiver design sensitivity in response to desired signal conditions while, at the same time, permitting leading edge gating before intermediate frequency amplification of the reecived pulse energy.

It is a further object of the present invention to achieve leading edge pulse gating by interruption of local oscillator energy supply to the mixer means normally operative to convert incident signal frequencies to receiver intermediate frequencies.

The invention will be further understood with reference to the exemplary embodiments shown in the drawings, in which.

Figure 1:
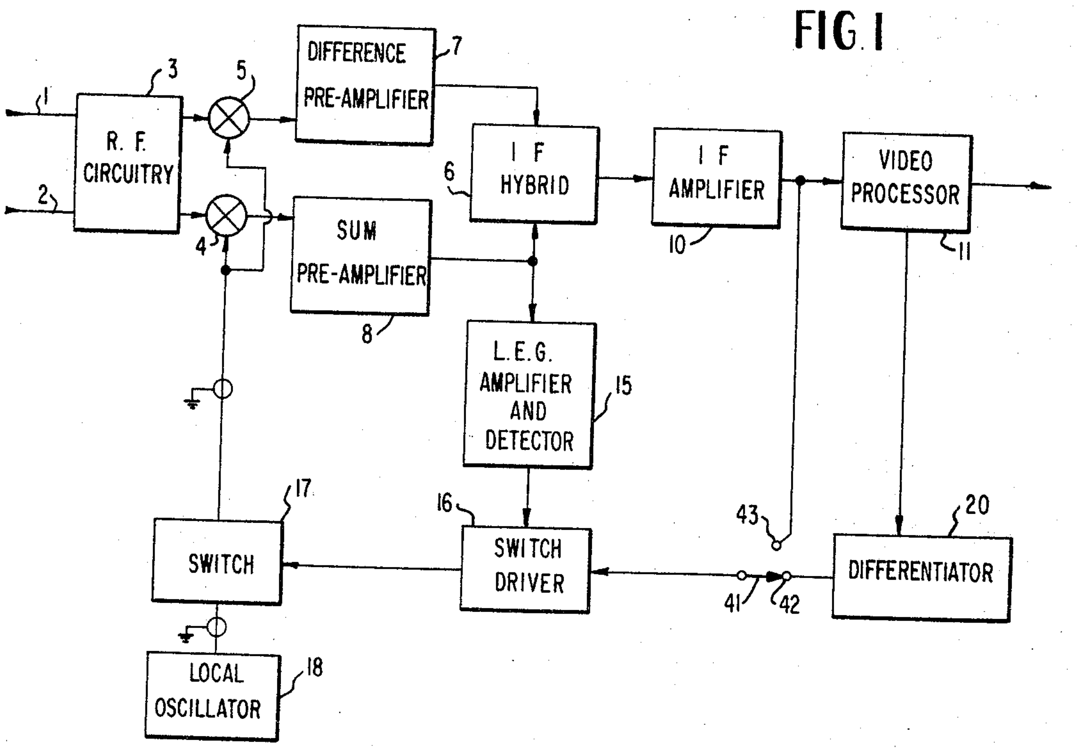
FIGURE 1 shows in block diagram the application of the present invention to a monopulse receiver system.

The receiver system of FIG. 1 is of the monopulse type employing a pair of antennas shown diagrammatically at 1 and 2 for receiving the incident radio frequency pulse energy. By radio frequency circuitry 3 known in the art, sum and difference radio frequency signals, related to the energy incident on the antennas, are supplied respectively to frequency converters 4 and 5, otherwise known as mixers.

The intermediate frequency energy in the two channels is then supplied to the intermediate frequency hybrid 6 through the respective preamplifiers 7 and 8.

Hybrid 6 drives the intermediate frequency amplifier 10, whose output is utilized in the subsequent sections of the system, including video processor 11. As above discussed, conventional leading edge gating systems operate in dependency of the output of intermediate frequency amplifier 10, and for this purpose, it has been essential to design amplifier 10 with a very fast response to received pulses at the converted frequency. To achieve the necessary operation, amplifier 10 is normally designed for a broad bandwidth, one much broader than was necessary or desirable for amplification of the gated signal of foreshortened pulse duration during normal operation with such signals. Consequently, amplifier 10, as embodied in the prior art, was susceptible of amplifying interfering adjacent frequency energy above and below that of the desired signal components and additionally inherently operated with an unnecessary enhanced noise level. The design requirements of its fast response, therefore, inherently degraded the over-all sensitivity of the receiver system and inhibited optimization of intermediate frequency amplifier design for desired pulse signal characteristics. In an exemplary application, leading edge gating effected on the output of the intermediate freuency amplifier 10 required, for the necessarily rapid ise time, a bandwidth of about 5 megacycles. Where 0.2 nicrosecond leading edge gating is applied before the ignal reaches the intermediate frequency amplifier, the lesign of the intermediate frequency amplifier was optimized at a bandwidth of 1.25 megacycles for a specific adio frequency pulse characteristic having a pulse width, n this instance, of 0.8 micro-second. The reduction in noise bandwidth by a factor of 4 thus achieved reduced he theoretical noise power by 6 db, increasing the receiver sensitivity by 6 db. An increase in receiver sensitivity of this magnitude will double the range at which the receiver will operate on the designed pulse characteristics. Additionally, in the monopulse system involved, incorporation of the present invention eliminated the requirement for precise matching of I.F. and video delay lines. Discrimination between pulses from other sources was also increased by the reduction of receiver bandwidth.

In the system of FIG. 1, preamplifiers 7 and 8 function to select the desired conversion frequency components for application to the intermediate frequency hybrid 6. The output of one of the channels, preferably that of the sum preamplifier, is applied to leading edge gating amplifier and detector 15. This component develops the necessary output signal in dependency on which the application of local oscillator energy to frequency converters 4 and 5 for leading edge gating is interrupted. Preferably, the control function accomplished in response to the output of the leading edge gating amplifier is dependent upon its supplying signal amplitude above a predetermined threshold level which may be appropriately preselected. The stop pulse from amplifier 15 is applied to switch driver 16 to open normally closed switch 17 through which the signal from local oscillator 18 is normally conducted to mixers 4 and 5. Thus, in accordance with this invention, the incoming signal frequency energy of the pulse is interrupted at a predetermined time after its initiation. In a specific design, the transmission time through sum preamplifier 8, leading edge gating amplifier and detector 15, the switch driver 16, and switch circuit 17, aggregated the desired predetermined delay periods. Such time, of course, if necessary, could be established at different values, according to the objectives of the design engineer, by well-known expedients.

In the over-all system involved, pulse repetition frequency gating is employed to diminish the system response to pulses having a repetition rate differing substantially from that of the repetition rate to be encountered in the contemplated environment. For this purpose, video processor 11 is designed to supply through switch 41 in the position shown in FIGURE 1, a blanking and enabling pulse, with the enabling portion occurring at an appropriate time with respect to the arrival of each desired incoming pulse. This was differentiated at 20 and adjunctively supplied to operate switch driver 16 in the event the same had not been previously activated to open switch 17 by the signal from the leading edge gating amplifier and detector.

Thus, in the operation of the system of FIG. 1 under design conditions of repetition rate and signal level, conduction of local oscillator frequency is interrupted by switch 17 immediately after the leading edge of the pulse by the output of the leading edge amplifier and detector 15. In case design output level does not develop, the trailing output pulse from differentiator 20 will operate normally open switch 17 through switch driver 16 to terminate the application of local oscillator energy to the mixers 4 and 5 shortly before the termination of the full pulse length of the expected signal.

The leading differentiated pulse from the pulse repetition frequency gate supplied by video processor 11 occurs shortly before the incidence of the next expected pulse, and through switch driver 16 re-establishes application of local oscillator energy to mixers 4 and 5 for its reception.

Figure 2:
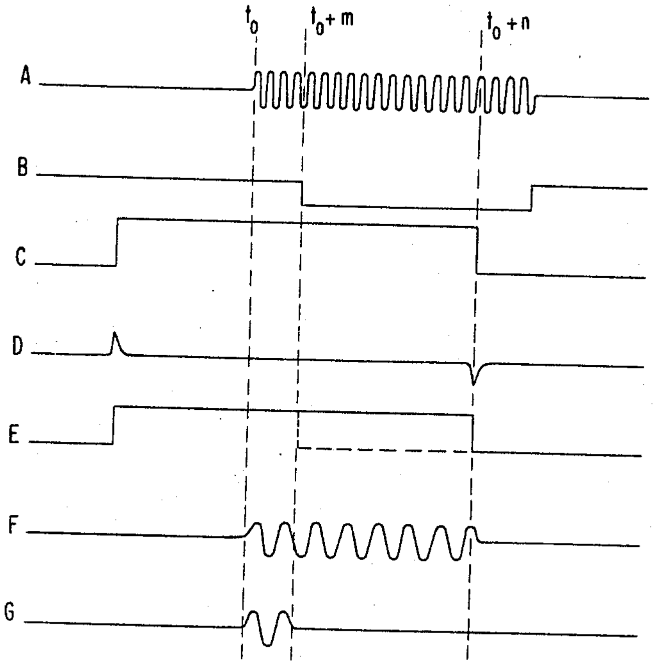
FIGURE 2 shows diagrammatically operational wave forms present in the system of FIG. 1.

Typical signal and control wave forms encountered in the system of FIG. 1 are shown in FIG. 2. At A is diagrammatically shown a radio frequency wave train beginning at $t_0$, representing one of a series of regularly recurrent signals incident at antennas 1 and 2. Assuming the incident pulse voltage is of sufficient amplitude to operate leading edge gating amplifier and detector 15, the signal applied to switch driver 16 in response to the pulse shown at A is shown at B. This latter or disable pulse operates after the time period $t_0+m$ where $m$ is the time segment of the leading edge of pulse A gated by the system. At C is shown the pulse repetition frequency gate signal delivered through gate 41 by video processor 11, and at D is shown its derivitive as delivered from differentiator 20. In the specific example, this signal trips switch driver 16 by its leading positive going wave form to supply enable wave form E for closing normally open switch 17 in advance of receipt of pulse A, and to maintain the gate conductive for a predetermined portion of the same pulse, shown as ending at $t_0+n$. Thus, a lower level incident pulse A would have the somewhat shortened duration under the pulse repetition frequency gate, as shown at F, whereas the higher amplitude incident pulse would terminate conduction of oscillator frequency energy through switch 17 at $t_0+m$, as shown at G, because of the action of leading edge gating amplifier and detector 15.

Figure 3:
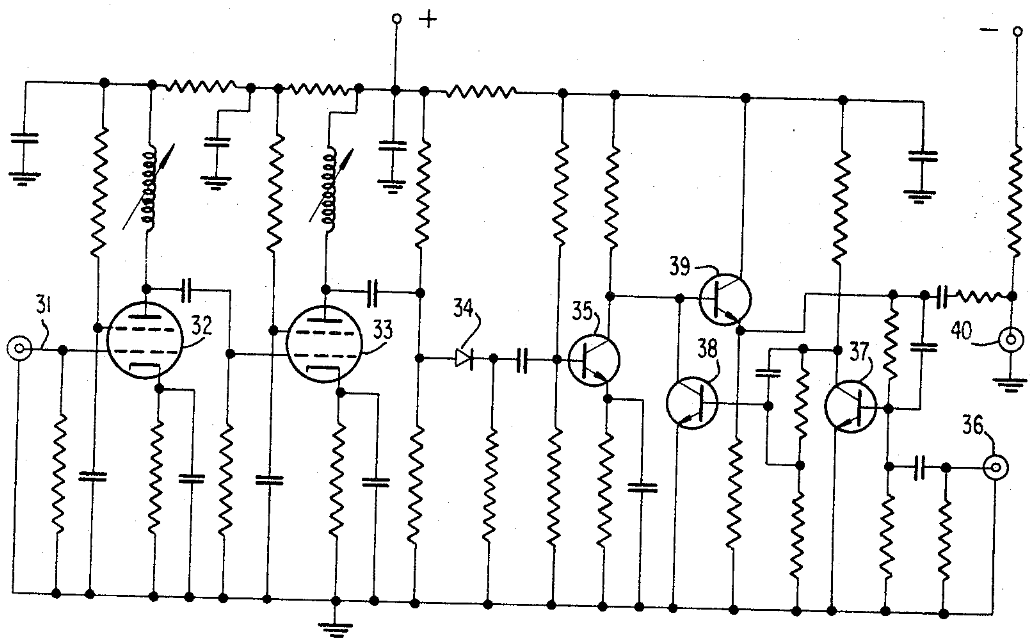
FIGURE 3 shows a detailed schematic of certain components of FIG. 1.

FIG. 3 shows circuitry for operating a diode switch employed at 17 for controllably transmitting local oscillator energy to mixers 4 and 5. Here the sum voltage at intermediate frequency from preamplifier 8 (FIG. 2A) is applied to terminal 31 to drive series tuned amplifier stages 32 and 33 to develop a triggering potential through diode 34 on the base of transistor 35.

The pulse repetition frequency gate voltage (FIG. 2E) is applied at terminal 36. Transistors 37 and 38 form a bistable multivibrator with 37 normally non-conducting and triggered into conduction by the positive going wave form (FIG. 2D), as differentiated from the pulse repetition frequency gate voltage. When normally non-conductive transistor 37 goes into conduction, its collector voltage drops, transistor 38 is cut off, and emitter follower 39 develops the gating voltage shift (FIG. 2E) delivered at terminal 40 for unblocking the diode switch 17. Switch 17 remains conductive until wave form F is rectified by diode 34 at the necessary level to establish conduction of transistor 35 which, through transistor 39, terminates pulse E at time $t_0+m$ to terminate conduction in transistor 37 concurrently with initiating conduction in transistor 38. In the event that pulse A is of insufficient amplitude to develop sufficient triggering voltage through diode 34, the trailing pulse (FIG. 2D) differentiated from the pulse repetition frequency gate is applied negatively to the base of transistor 37 at time $t_0+n$. Under these circumstances, therefore, a pulse of longer duration, $m$, is delivered to the intermediate frequency amplifier.

As mentioned above, the system is not in any way necessarily employed with the pulse repetition frequency gating system. In fact, switch 41 shown in FIG. 1 may be shifted from contact 42, on which this signal is developed, to contact 43 to receive the intermediate frequency amplifier output pulse after a predetermined time delay. With this connection, rectified I.F. energy is applied directly to switch driver 16 at terminal 36, (FIG. 3). The switch driver 16 comprises a monostable timing multivibrator which in response to an output of sufficient amplitude from leading edge gating amplifier 15 blocks conduction through switch 17 at time $t_0+n$ and maintains the same non-conductive until after the end of the incident pulse shown at A, FIG. 2. Relaxation of the multivibrator to its normal condition, re-establishing conduction through switch 17, occurs prior to the reception of the succeeding pulse following that shown at A. In case the incident pulse is of insufficient amplitude to operate switch 17 through driver 16, the output of intermediate frequency amplifier 10 will terminate transmission through the mixers, in the circuit of FIG. 1, at a time period between $t_0+n$ and $t_0+m$.

The embodiments shown in the drawings of the present invention are exemplary only, and the scope of the invention is to be determined only to the appended claims.

What is claimed is:

1. In a pulse receiver designed to receive recurrent pulses, mixer means for converting each received pulse signal to an intermediate frequency, means to supply local oscillator energy to the mixer means, control means responsive to IF energy from the mixer means to deactivate the supply means and terminate the supply of oscillator energy to the mixer means, and means recurrently operative to prevent the supply of oscillator energy to the mixer means between received pulses.

2. In a pulse receiver designed to receive recurrent pulses, mixer means for converting each received pulse signal to an intermediate frequency, means to supply local oscillator energy to the mixer means, control means responsive to IF energy from the mixer means to deactivate the supply means and terminate the supply of oscillator energy to the mixer means, and means to reactivate the supply means to supply oscillator energy to the mixer means prior to the anticipated reception of subsequent pulses, based upon knowledge of the pulse repetition frequency of the desired incoming signal.

3. In a pulse receiver, mixer means for converting each received pulse signal to an intermediate frequency, means to supply local oscillator energy to the mixer means, control means responsive to IF energy from the mixer means to deactivate the supply means and terminate the supply of oscillator energy to the mixer means, said control means comprising means operative to reactivate the supply means after a preselected timing period.

4. In a pulse receiver, mixer means for converting each received pulse signal to an intermediate frequency, means to supply local oscillator energy to the mixer means, control means responsive to IF energy from the mixer means to deactivate the supply means and terminate the supply of oscillator energy to the mixer means, said control means including switch means for coupling local oscillator energy to said mixer means.

5. In a pulse receiver, mixer means for converting each received pulse signal to an intermediate frequency, means to supply local oscillator energy to said mixer means, control means responsive to IF energy from said mixer means to deactivate the supply means to accomplish leading edge gating of received pulse signals by selectively terminating the supply of oscillator energy to said mixer means, and an intermediate frequency amplifier fed by said mixer means, said intermediate frequency amplifier having a narrow bandwidth optimized for signal to noise ratio for predetermined signal pulse width rather than leading edge gate requirements.

6. The structure of claim 5 further including:
circuit means responsive to the I.F. amplifier output to deactivate the supply means in the event the I.F. energy from the mixer means fails to do so.

7. The structure of claim 6 further including:
means to reactivate the supply means after a time delay period.

8. A pulse direction finding receiver comprising a pair of pulse signal input channels, hybrid circuit means fed by the input channels and supplying output sum and difference signals, mixer means fed by the hybrid circuit means for converting the received frequency to intermediate frequency, local oscillator means coupled with the mixer means, and control means for accomplishing leading edge gating of incoming pulse signals by decoupling oscillator energy from the mixer means responsively to a time delayed sum output signal.

9. The structure of claim 8 wherein:
the control means is operative after a time delay t recouple oscillator energy to the mixer means.

10. The structure of claim 9 wherein the control mean is responsive only to the hybrid sum output signal.

11. The structure of claim 8 further including:
an intermediate frequency amplifier fed by the mixe means having a narrow bandwidth optimized fo signal to noise ratio for predetermined pulse signa characteristics independently of amplifier rise time

12. The structure of claim 11 further including:
circuit means responsive to the I. F. amplifier outpu to operate the control means in the event the I. F energy from the mixer means fails to do so.

13. The structure of claim 12 further including:
means to recouple oscillator energy with the mixe means a predetermined time after it is decouplec therefrom by the control means.

14. In a pulse receiver, radiation signal input means frequency conversion means fed from the input means intermediate frequency amplifier means fed from the fre quency conversion means, and leading edge gating mean responsive to IF energy from the frequency conversior means independently of the IF amplifier means operative to terminate transmission of pulse energy to the IF amplifier means, said IF amplifier having a narrow bandwidth optimized for signal to noise ratio for predetermined signal pulse width rather than leading edge gating requirements.

15. In a pulse receiver, mixer means for converting each received pulse signal to an intermediate frequency, means to supply local oscillator energy to said mixer means, and control means responsive to IF energy from said mixer means, said control means including a switch disposed between said supply means and said mixer means, and a switch driver for controlling the operation of said switch, said switch driver having an input from a leading edge gating amplifier, later device being arranged to receive IF energy from said mixer means, and in response thereto, periodically cause said switch driver to operate said switch so as to prevent local oscillator energy from being supplied to said mixer means, thus to accomplish leading edge gating of received pulse signals, said leading edge gating amplifier functioning only for pulse signal amplitudes above a certain threshold level.

16. The device as defined in claim 15 in which additional input means are connected to said switch driver for periodically bringing about a termination of the supply of oscillator energy to said mixer means, said addition input means enabling lower level incident pulses to bring about the operation of said switch to periodically cut off the supply of local oscillator energy to said mixer means, but accomplished with greater time delay.

17. The device as defined in claim 15 in which said switch driver may also receive pulse repetition frequency gating pulses, such pulses allowing the supply of local oscillator energy to said mixer means only at certain times, based upon knowledge of the pulse repetition frequency of the desired incoming signal.

18. In a pulse receiver designed to receive recurrent pulses, mixer means for converting each received pulse signal to an intermediate frequency, means to supply local oscillator energy to said mixer means, and control means responsive to IF energy from said mixer means to periodically terminate the supply of oscillator energy to said mixer means, said control means comprising a switch disposed between said supply means and said mixer means, and a switch driver for controlling the operation of said switch, said switch driver utilizing a monostable timing multivibrator which, in response to IF energy from said mxier means, blocks condition through said switch, and maintains same non-conductive until after the end of the incoming pulse signal, but reestablishing condition prior to the reception of the next incoming pulse, thus accomplishing a leading edge gating of such pulses.

19. The pulse receiver as designed in claim 18 in which he input to said multivibrator may be from a leading edge ating amplifier as well as from an IF amplifier, with in- ut signals larger than a certain threshold value arriving hrough said gating amplifier, and smaller signals arriving ith greater time delay through said IF amplifier.

References Cited

UNITED STATES PATENTS

| | | | |
|---|---|---|---|
| 2,209,330 | 7/1940 | Haffcke | 325 478 |
| 2,909,593 | 10/1959 | Dome | 325—478 X |
| 3,283,322 | 11/1966 | Hovda et al. | 343—16 |
| 3,339,144 | 8/1967 | Squires | 325—478 |

ROBERT L. GRIFFIN, *Primary Examiner.*

R. MURRY, *Assistant Examiner.*

U.S. Cl. X.R.

325—341, 395